(12) United States Patent
Hunter et al.

(10) Patent No.: US 11,286,751 B2
(45) Date of Patent: Mar. 29, 2022

(54) DOWNHOLE POWER SOURCE

(71) Applicant: Swellfix UK Limited, Aberdeen (GB)

(72) Inventors: John Hunter, Westhill (GB); Anthony Wilson, Westhill (GB); Matthew Ramsey Thorpe, Westhill (GB); Joyce Ann Rosie, Westhill (GB)

(73) Assignee: SWELLFIX UK LIMITED, Aberdeen (GB)

( * ) Notice: Subject to any disclaimer, the term of this patent is extended or adjusted under 35 U.S.C. 154(b) by 0 days.

(21) Appl. No.: 16/619,367

(22) PCT Filed: Jun. 14, 2018

(86) PCT No.: PCT/GB2018/051644
§ 371 (c)(1),
(2) Date: Dec. 4, 2019

(87) PCT Pub. No.: WO2018/229496
PCT Pub. Date: Dec. 20, 2018

(65) Prior Publication Data
US 2020/0149372 A1 May 14, 2020

(30) Foreign Application Priority Data

Jun. 16, 2017 (GB) ..................................... 1709629

(51) Int. Cl.
*E21B 41/00* (2006.01)
*H01M 6/42* (2006.01)
*H01M 6/50* (2006.01)

(52) U.S. Cl.
CPC ........... *E21B 41/0085* (2013.01); *H01M 6/42* (2013.01); *H01M 6/5011* (2013.01); *H01M 2220/10* (2013.01)

(58) Field of Classification Search
CPC .................................................. E21B 41/0085
See application file for complete search history.

(56) References Cited

U.S. PATENT DOCUMENTS

| 3,666,961 A | 5/1972 | Bogue et al. |
| 3,693,068 A | 9/1972 | Bogue et al. |
| (Continued) | | |

FOREIGN PATENT DOCUMENTS

| JP | 2015146258 A | 8/2015 |
| WO | WO-2014/118503 A1 | 8/2014 |

OTHER PUBLICATIONS

International Search Report PCT/ISA/210 for International Application No. PCT/GB2018/051644 dated Aug. 17, 2018.

(Continued)

*Primary Examiner* — Giovanna Wright
(74) *Attorney, Agent, or Firm* — Harness, Dickey & Pierce, P.L.C.

(57) ABSTRACT

A power source system including a plurality of cells. The power source system uses electrical charge or current generated by a reaction in at least one of the cells to provide at least one operating material to at least one other of the cells. Optionally, the power source system uses the electrical charge generated by the reaction in the at least one of the cells to provide the at least one operating material to the at least one other of the cells only when the state of charge of the at least one of the cells is equal to or below a threshold or when the use of the cell is equal to or above a threshold. Optionally, in an initial or non-operational state, one or more or each of the cells is dry or without the at least one operating material and the power source system is configured to selectively switch at least one of the plurality of cells from the non-operational state to an operational state by providing the at least one operating material to the at least one cell.

19 Claims, 8 Drawing Sheets

(56) References Cited

U.S. PATENT DOCUMENTS

| | | |
|---|---|---|
| 2003/0116321 A1 | 6/2003 | Zhang et al. |
| 2013/0229142 A1 | 9/2013 | Teodorescu et al. |
| 2015/0361788 A1* | 12/2015 | Liu .................... E21B 41/0085 |
| | | 340/855.4 |
| 2016/0218381 A1 | 7/2016 | Forte |
| 2019/0316446 A1* | 10/2019 | Montoya ............... E21B 47/017 |

OTHER PUBLICATIONS

Written Opinion of the International Searching Authority PCT/ISA/237 for International Application No. PCT/GB2018/051644 dated Aug. 17, 2018.
Great Britain Search Exam Report for GB1709629.8 dated Dec. 14, 2017.
International Preliminary Report on Patentability for corresponding Application No. PCT/GB2018/051644 dated Dec. 26, 2019.
European Examination Report dated Dec. 15, 2021 for corresponding European Application No. 18 735 382.6.

* cited by examiner

DOWNHOLE POWER SOURCE

CROSS-REFERENCE TO RELATED APPLICATIONS

This application is a national phase under 35 U.S.C. § 371 of PCT International Application No. PCT/GB2018/051644 which has an International filing date of Jun. 14, 2018, which claims priority to United Kingdom Application No. GB1709629.8, filed Jun. 16, 2017, the entire contents of each of which are hereby incorporated by reference.

FIELD

The present disclosure relates to power sources, such as batteries or other electrochemical cells, and associated methods of use, particularly in a downhole environment.

BACKGROUND

Production oil and gas wells may contain downhole devices such as actuators, sliding sleeves, valves, ports and the like that may, at various times throughout the life of the well, require actuation or operation. Further, production wells may comprise various sensors, with associated monitoring, data-acquisition, logging and communication apparatus for monitoring conditions of the well, tools and the downhole environment.

Such equipment may be operated by running dedicated tools into the well to actuate, configure and/or generally interact with the downhole equipment. Such operations can be costly, time consuming and incur risk.

Alternatively, dedicated downhole power supplies, such as batteries, may be provided to supply power to downhole equipment. In such an arrangement, the downhole equipment may be operated remotely, such as by transmission of a triggering signal by an operator located at the surface to the downhole equipment through the well. Further, sensors and data acquisition equipment located downhole may be adapted to communicate with receivers or transceivers located at surface.

Such batteries may be located permanently, or semi-permanently, downhole. The lifespan of a well may be many years, and may typically be in the range of 15 to 25 years from first oil to abandonment. Thus, it is desirable for such batteries to have long life-spans to mitigate a need for replacement or replenishment, and to reduce a requirement for intervention operations in the well.

Traditionally, such batteries have been primary lithium cells. Attempts at employing secondary cells have been limited due to typical charge cycles of secondary cells being less than two years.

Generally, all batteries are depleted of charge, i.e. self-discharge, to some extent during storage. This charge-depletion issue is further exacerbated in a downhole environment, where it can be accelerated by high temperatures. Lithium cells, particularly when exposed to temperature in excess of approximately 100 degrees Celsius, are prone to such charge depletion. At such temperatures, a solid electrolyte interface (SEI) layer may form between the battery's electrodes and an electrolyte within the Lithium cell. The SEI layer may effectively passivate the electrodes and/or degrade the porosity, and thus the permeability, of a membrane within the cell, reducing overall cell performance. Such a degradation in the porosity of the membrane may be particularly prevalent in battery arrangements where the electrodes abut the membrane.

It is an object of at least one example described herein to obviate or at least mitigate at least one of the problems in the prior art.

It is an object of at least one example described herein to provide a technically simple and/or commercially more cost effective method and apparatus for a downhole battery.

SUMMARY

Various aspects of the present disclosure are defined in the independent claims. Some preferred features are defined in the dependent claims.

According to an aspect of the present disclosure there is provided a power source system comprising a plurality of cells; wherein
the power source system is configured to use electrical charge or current generated by a reaction in at least one of the cells to provide at least one operating material to at least one other of the cells.

According to an aspect of the disclosure, there is provided a power source system. The power source system may comprise at least one, e.g. a plurality of, cells.

The power source system may optionally be configured to use electrical charge or current generated by a reaction in at least one of the cells to provide at least one operating material to at least one other of the cells.

The power source system may optionally be configured to convert at least one of the cells and/or at least one other of the cells from a non-operational state to an operational state, or to make at least one operational cell from at least one of the cells and/or at least one other of the cells, by providing at least one operating material to the at least one cell and/or to the at least one other of the cells, which may be done with the at least one of the cells and/or the at least one other of the cells in-situ, e.g. downhole or remotely.

The power source system may be configured to convert the at least one cell and/or the at least one other of the cells from a non-operational state to an operational state, or to make at least one operational cell from the at least one cell and/or the at least one other of the cells, by providing the at least one operating material to the at least one cell and/or to the at least one other of the cells using electrical charge or current generated by a reaction in at least one of the cells and/or by a generator, e.g. a downhole generator, which may optionally be driven by an impeller, such as that described in WO2014/118503.

The power source system may be or comprise a power source system according to the preceding aspect.

The following features described in relation to this aspect apply equally to the present aspect, the preceding aspect and the following aspects.

The power source system may be configured to use the electrical charge generated by the reaction in the at least one of the cells to provide the at least one operating material to the at least one other of the cells only when the state of charge of the at least one of the cells is equal to or below a threshold or when the use of the cell is equal to or above a threshold, e.g. a threshold duration. For example, the power source system may be configured to provide the at least one operating material to the at least one other of the cells when charge of the at least one cell is low or almost depleted. In other words the power source system may be configured that a new cell is brought into an operational state by providing it with operating material when at least one other of the cells that is already in an operational state has a state of charge equal to or below the threshold or when the use of the cell is equal to or above the threshold.

The power source system may comprise at least one storage vessel for storing the at least one operating material. The power source system may be configured to use the electrical charge generated by the reaction in the at least one of the cells to provide the at least one operating material from the at least one storage vessel to the at least one other of the cells.

The reaction may be or comprise a reaction that utilises the at least one operating material. The at least one operating material may be a material that is required by at least one or each of the cells to perform the reaction. Each of the cells may be configured to perform the reaction, in use. The reaction may be or comprise an electrochemical reaction. The respective cells may be, comprise or be comprised in at least part of respective power sources, e.g. electrochemical power sources. In use, each cell may be adapted to operate as a battery, accumulator or electrochemical cell. In use, each cell may be adapted or operable to generate electrical charge. In use, one or more or each cell may be, comprise or be comprised in a respective lithium or lithium ion cell, battery or accumulator. In use, each cell may be adapted to operate as a primary battery. In use, each cell may be adapted to operate as a secondary battery.

The operating material may be or comprise or be comprised in a fluid, liquid, gas, a colloid or a solution. The operating material may be or comprise one or more reactants, such as reactants for the reaction or electrochemical reaction. At least one of the reactants may be or comprise an oxidant and/or a material that is reduced during the reaction. At least one of the reactants may be or comprise a reductant and/or a material that is oxidized during the reaction. The operating material may be or comprise an electrolyte, such as a liquid electrolyte.

One or more or each cell may comprise a separator, which may be or comprise a membrane such as an ion exchange membrane, a porous separator such as a porous polymeric separator or a solid electrolyte such as a solid polymer electrolyte membrane. One or more or each cell may comprise at least two chambers, which may be separated by the separator. One or more or each cell may comprise at least one, e.g. two or more electrodes, which may comprise at least a cathode and an anode. At least one electrode, e.g. the cathode, may be provided in one of the chambers, e.g. a cathode chamber, on one side of the separator and at least one other electrode, e.g. the anode, may be provided in another one of the chambers, e.g. an anode chamber, on another side of the separator. It will be appreciated that the anode chamber and the cathode chamber may be separated by the separator. At least one or each of the electrodes may be a current collector.

In an example, one or more or each of the operating materials may operate as part of the electrodes of the cells, e.g. the electrodes are operable as an anode or a cathode. The electrodes, e.g. the anode and/or cathode, may be solid electrodes. At least one of the operating materials may be or comprise an electrolyte, such as a liquid electrolyte, required to operate the cell to produce an electrical current.

A method may comprise using the electrical charge generated by the reaction in the at least one of the cells to convey the same operating material, e.g. an electrolyte, to respective different chambers (e.g. the cathode chamber and the anode chamber) of the at least one other of the cells In an example, at least one, two or each electrode of the cells may be or comprise a current collector or electrical connector. One, two or more of the operating materials may comprise the reactants, e.g. at least one of the operating materials may comprise the oxidant and/or at least one of the operating materials may comprise a reductant. In this example, the chambers may be separated by a solid electrolyte or an ion exchange membrane.

The method may comprise using the electrical charge generated by the reaction in the at least one of the cells to provide at least two respective different operating materials, e.g. at least a first material comprising an oxidant and at least a second material comprising a reductant, to respective different chambers (e.g. the cathode chamber and the anode chamber) of the at least one other of the cells.

In the initial or non-operational state, one or more or each of the cells may be dry or be without the at least one operating material. Initially, one or more of the cells may be in the operational state.

Initially, one or more of the cells may contain the at least one operating material but at least one other of the cells may be dry or may not contain the at least one operating material. The cells comprising the at least one operating material may be in an operational state. The cells may all be of the same type, e.g. configured to use the same electrochemistry to provide the charge.

The one or more cells that are initially in the operational state may be a different type of cell to the cells that are initially in the non-operational state, e.g. the one or more cells that are initially in the operational state may be sealed or closed cells and/or may be primary cells, such as lithium or lithium ion cells.

The power source system may be configured to use electrical charge or current generated by a generator to provide at least one operating material to one or more or each of the cells, e.g. a first or initial cell or to at least one of the cells and/or one other of the cells.

For example, the generator may be configured to make a first or initial operational cell or switch a first or initial cell into the operational state. Optionally charge or current from the first or initial cell or operational cell may then be used to switch another cell into the operational state or to make a second operational cell.

In an example, the charge or current from the generator may be used to make more than the first operational cell, e.g. to make or switch at least a further or each cell or operational cell by providing at least one operating material. In this way, a relatively small current or charge from the generator may be used to provide operating material to one or more or each of the cells. In this way, for example, it may be possible to obtain more current or charge from the cell or operational cell comprising the operating material than could be obtained from the generator or the current or charge from the cells or operational cells may be more reliable or consistent than that from the generator. The generator may be or comprise a downhole generator, which may optionally be driven by an impeller, such as that described in WO2014/118503, The power source system may be configured to selectively switch at least one of the plurality of cells from the non-operational state to the operational state by providing the at least one operating material to the at least one cell, e.g. from the at least one storage vessel.

In the non-operational state, the respective cell may not be operable to generate an electrical charge. In the non-operational state, no electrochemical reaction may take place in the respective cell. In the non-operational state, the reaction or electrochemical reaction may be prevented or inhibited, e.g. due to the absence of the operating material.

In the operational state, the at least one operating material may be active or usable in an electrochemical reaction. In the operational state, the at least one reactant may be active in an electrochemical reaction with the at least one electrode. In the operational state, the respective cell may perform or be operable to perform the electrochemical reaction, such as a reduction-oxidation (REDOX) reaction. In the operational state, the electrochemical reaction may generate an electrical charge or current, e.g. from the reaction. In the operational state, the electrochemical reaction may generate an electrical charge or current at one or more terminal of at least one of the chambers of the respective cell. In the operational state, the respective cell or cells may operate as, or may be, a battery.

The power source system may comprise or be coupled to or coupable with a controller. The controller may be adapted to record and/or monitor a usage and/or a state of charge of the power source system.

The power source system may be adapted to enable or control transmission of at least one operating material from the storage vessel to at least one of the plurality of cells when the usage of the at least one of the plurality of cells (e.g. that is in the operational state), is substantially equal to or above the threshold or when the state of charge of the at least one of the plurality of cells (e.g. that is in the operational state), or some metric dependent thereon such as open circuit voltage, is equal to or below a threshold.

A plurality of cells may be arranged sequentially and/or in a cascaded manner, wherein the electrical charge or current generated by at least one of the plurality of cells (e.g. by the reaction therein) directly or indirectly enables transmission of the at least one operating material (e.g. from the storage vessel) to the at least one other of the plurality of cells.

For example, in an exemplary embodiment comprising at least three cells, wherein the cells are arranged or connected sequentially and/or in a cascaded manner, an electrical charge or current generated by the first of the cells may enable transmission of at least one operating material from the at least one storage vessel to a second of the cells. The transmission of at least one operating material from the at least one storage vessel to a second of the cells may take place when the usage of the first of the cells is substantially equal to or above the threshold or a state of charge of the first of the cells is equal to or below a threshold. Subsequently, an electrical charge generated by the reaction in the second of the cells involving the at least one operating material may directly or indirectly enable transmission of at least one operating material from the at least one storage vessel to a third of the three or more cells when the usage of the second of the cells, is substantially equal to or above a threshold or a state of charge of the second of the cells is equal to or below a threshold. In summary, the process may comprise using charge from an operational cell, when the use of the operational cell exceeds a threshold or the charge of the cell drops below a threshold, to transfer an operating material such as an electrolyte or one or more reactants for an electrochemical reaction, to a dry or unfilled cell that is in a non-operational state by virtue of not having the operating material. It will be appreciated that the process may be repeated for subsequent cells (or indeed for only two cells), dependant on the number of cells. A variation of the above process having two or more cells may also be carried out, wherein the generator, e.g. the downhole generator, is used to provide at least one operating material from the at least one storage vessel to the first cell, and the first cell is subsequently used to provide at least one operating material from the at least one storage vessel to the second cell, and so on if three of more cells are cascaded.

Each of the cells may be a primary cell. Each of the cells may not be a flow cell.

The power source system may be adapted for use downhole.

The power source system described above may be particularly suitable for long life operations, wherein the power source system comprises a plurality of cells and wherein one or more of the cells are provided in the non-operational state in which they lack the operating material required to perform the electrochemical reaction that generates the charge or current and are only brought into the operational state when needed by transferring the operational material to one or more of the previously non-operational cells using electrical charge generated by one or more operational cells when the charge of the operational cell equals or drops below a threshold or when use of the operational cell is above or beyond a threshold. In this way, loss of charge or a reduction in lifetime due to unwanted reactions between the operating material and the cell (e.g. with the electrodes or chambers) may be reduced or avoided.

At least one or each chamber of the cells may comprise a chemically inert coating on a surface, such as an interior surface. At least one or each chamber of the cells may comprise or be formed from a non-conductive material, such as a plastic or polymeric material, PEEK, or the like.

At least one or each chamber of the cells may comprise a rigid outer casing. The rigid outer casing may comprise a material resistant to corrosion, such a plastic, PEEK, stainless steel, or the like. Each cell may be substantially cylindrical.

Each electrode may be porous such that each electrode is permeable to the operating material, such as an operating fluid, located in, pumped into, or circulated through or within the associated cell.

The or each separator may be selectively porous, e.g. such that the operating material, that is located in, pumped into, or circulated through or within each chamber of the respective cell is able to selectively propagate through the or each separator. The or each separator may be an ion-exchange membrane such as a NAFION membrane or the like.

The or each separator may partition an interior of each chamber of at least one or each of the cells. The or each separator may electrically isolate one of the electrodes from another of the electrodes. The or each separator may be arranged to prevent an electrical short circuit between the two or more electrodes. The or each separator may comprise a polymeric material. The or each separator may comprise a polyolefin based material.

At least one or each chamber of at least one or each of the cells may comprise at least one port, wherein the at least one port may be adapted for use as an inlet and/or an outlet, such as an inlet and/or an outlet for a fluid, such as the operating material.

At least one or each chamber of the respective cell may comprise at least one exhaust port.

The power source system may comprise a plurality of storage vessels. The storage vessel may comprise a plurality of storage vessels.

The or each storage vessel may comprise at least one compartment. The or each storage vessel may comprise a plurality of compartments.

The or each storage vessel may comprise at least one port adapted for use as an inlet and/or an outlet.

The or each storage vessel may be adapted for storage of at least one of the operating materials. First and second storage vessels may be respectively adapted for storage of a first and second operating material.

The or each storage vessel may comprise a non-electrically conductive material, such as a plastic or polymeric material, PEEK, or the like. The or each storage vessel comprise a rigid outer casing. The rigid outer casing may comprise a material resistant to corrosion, such a plastic, stainless steel, or the like. The or each storage vessel may be substantially cylindrical.

The or each storage vessel may comprise at least one pressure release valve. The or each storage vessel may be adapted to vent gas and/or fluid. The at least one pressure release valve may be adapted to vent gas and/or fluid from the or each storage vessel if a pressure within the or each storage release vessel exceeds a pressure threshold.

The or each storage vessel may be adapted for intake of fluid, e.g. the operating material. The or each storage vessel may be adapted for output of fluid, e.g. the operating material.

The or each storage vessel may be in direct or indirect fluid communication with a transfer system. The or each storage vessel may be in direct or indirect fluid communication with at least one of the plurality of cells.

At least one of the operating materials may be or comprise an organic electrolyte, an inorganic electrolyte, an alkali metal hydroxide, ammonium chloride, zinc chloride, or the like. The cathode may comprise lithium or be configured to receive lithium ions. The anode may comprise Manganese Dioxide, Carbon Monoflouride, Thionyl Chloride, Iron Disulphide, Copper Oxide, or the like.

The power source system may comprise a transfer system for providing the at least one operating material to selected cells, e.g. from the at least one storage vessel. The transfer system may be operable using the charge or current generated by at least one of the cells, e.g. by at least one cell in an operating state. The transfer system may be operable by the controller.

The transfer system may be adapted to induce a movement or flow of the at least one operating material, e.g. from the at least one storage vessel, to at least one or each of the plurality of cells. The transfer system may comprise a pump. The transfer system may be adapted to pump the at least one operating material from the at least one storage vessel to at least one of the cells. However, it will be appreciated that other suitable transfer mechanisms may be used. For example, the transfer mechanism may comprise or be configured to operate a switch or valve or other mechanism for allowing the operating material from the at least one storage vessel to transfer to the selected cell or cells, e.g. under the action of a pressure differential or gravity and/or the like.

The power source system may be configured to use electrical charge or current generated by a reaction in the at least one of the cells (and/or electrical charge or current generated by the generator) to at least partially or wholly power the transfer system to provide the at least one operating material to the at least one other of the cells.

The transfer system may be adapted to induce a flow of, and/or pump, operating material from at least one of the plurality of cells. The transfer system may be adapted to flush at least one of the plurality of cells with a further fluid. The transfer system may be adapted to empty or drain at least one of the plurality of the chambers.

The transfer system may be adapted to induce a flow of, and/or pump, operating material from at least one of the plurality of cells to a further storage vessel.

The transfer system may be adapted to induce a flow of, and/or pump, reactant from at least one of the plurality of cells, such that the reactant exits the battery apparatus.

The transfer system may be communicatively linked to the controller.

The transfer system may be controlled and/or actuated and/or triggered by the controller.

The transfer system may powered by the controller. The transfer system may be powered by at least one of the cells, e.g. one of the cells that is in an operational state.

The controller may comprise an electronic and/or electrical system.

The controller may be adapted to receive power from at least one of the cells that are in the operational state.

In use, during latter stages of operation that are subsequent to the initial stage of operation, the controller may be adapted to receive power from at least one other of the cells, e.g. a cell that was initially or previously in a non-operational state and subsequently switched into the operational state.

The controller may comprise at least one microprocessor and/or microcontroller. The controller may comprise a memory. The memory may comprise a non-volatile memory and/or a volatile memory.

The controller may be adapted to record and/or monitor a usage of cells and/or state of charge of the cells. The controller may be adapted to record and/or monitor data from at least one sensor. Data relating to the usage of the cells and/or data from at least one sensor may be stored in the memory.

The controller may be programmed with, or adapted to calculate, an initial and/or maximum capacity (i.e. the amount of electric charge that can be delivered) of at least one or each cell. The controller may be programmed with, or adapted to calculate, an initial and/or maximum capacity of at least one or each of the cells. The controller may be adapted to calibrate of adjust the initial and/or maximum capacity based on measured or programmed parameters and/or received data.

The controller may be adapted to calculate an amount of energy depleted from the at least one or each cell. The controller may be adapted to calculate an amount of energy depleted from a primary cell and/or at least one or each of the plurality of cells based on measured and/or programmed parameters.

The controller may be adapted to actuate, trigger and/or operate the transfer system, e.g. based on the determined usage and/or the state of charge of one or more of the cells (e.g. one or more of the cells in the operational state).

The measured and/or programmed parameters may comprise data relating to temperature and/or pressure within an operating environment of the power source system. The measured and/or programmed parameters may comprise data relating to temperature and/or pressure of, within, or in the immediate proximity of, at least one or each of the cells. The measured and/or programmed parameters may comprise data relating to a usage of at least one or each of the cells. The measured and/or programmed parameters may comprise data relating to quantity and type of use of the power source system, such as use to actuate a downhole tool.

The controller may be programmed with details of the electrical loads that the power source system may be used to power.

The controller may be adapted to control how operating materials are mixed within at least one of the plurality of cells. The controller may be adapted to control parameters such as quantity, flow rate and pressure of operating materials within the at least one or each of the cells, e.g. within the chambers of the cell.

The controller may comprise, be programmed with, or calculate, the threshold. The threshold may be associated with at least one or each of the plurality of cells. The threshold may correspond to a proportion of a calculated or predetermined available usage of at least one or each of the cells. For example, the threshold may be programmed or selected to correspond to usage of substantially 90% of the available charge i.e. 10% of the available charge remaining within at least one of the plurality of cells. In other examples, the threshold may be programmed or selected to be substantially higher or lower than 90% of the available charge, such as 50%, 75%, 85% or 95% of the available charge.

The controller may be adapted to measure and/or record a voltage or open circuit voltage at a terminal of the power source system and/or one or more or each of the cells thereof. In such an embodiment, the voltage may be indicative, or related, to a capacity or state of charge of the power source system and/or one or more or each of the cells thereof. In such an embodiment, the threshold may be predetermined, selected or programmed to be a voltage that corresponds to a capacity or a predetermined fraction of the capacity of the power source system and/or one or more or each of the cells thereof. For example, the threshold may be programmed to a voltage level that corresponds to a usage of 90% of the capacity of at least one of the cells. Similarly, in other exemplary embodiments, the threshold may be programmed or selected to be substantially higher or lower than 90% of the available charge, such as 50%, 75%, 85% or 95% of the available charge or more.

The controller may be communicably coupled to a device or tool, wherein the device or tool may be powered by the power source system. The controller may be adapted to provide data, such as a status of the power source system and/or one or more or each of the cells thereof.

The controller may comprise a transmitter, a receiver and/or a transceiver. The controller may be directly, or indirectly, communicably coupled to a transmitter or receiver, for example a transmitter/receiver located at surface. The controller may be adapted to provide data, such as a status of the power source system and/or one or more or each of the cells thereof, to the transmitter/receiver, such as the transmitter/receiver located at surface.

The controller may be adapted to provide data, such as an indication that a final cell is in use, or is depleted of charge to a specified level, i.e. that no more non-operational cells are available for use.

The controller may be adapted to control the flow of the at least one operating material into and/or out of at least one of the plurality of cells. The controller may be adapted to control the flow of the at least one operating material into and/or out of at least one of the plurality of cells based on parameters which include at least one of: quantity of the at least one operating material; flow rate of the at least one operating material; pressure of the at last one operating material and/or pressure in the cell. The controller may control a closed-loop system to control the flow of the at least one fluid into and/or out of at least one of the plurality of cells to ensure an optimum or maximum energy density per operation.

The power source system may comprise a safety system. The controller may comprise or be configured to implement the safety system. The safety system may be adapted to monitor and/or control at least a portion of the power source system and/or one or more or each of the cells thereof.

The safety system may comprise at least one sensor. The safety system may comprise at least one temperature and/or at least one pressure sensor. The safety system may be adapted to monitor a temperature and/or a pressure within the or each storage vessel and/or the cells.

The safety system may be adapted to control the at least one port of the or each storage vessel. The safety system may be adapted to control the at least one port of the or each storage vessel based on a signal or trigger generated by the controller.

The safety system may be adapted to control the at least one port and/or the at least one exhaust port of at least one of the plurality of cells. The safety system may be adapted to control the fluid port and/or the at least one exhaust port of at least one of the plurality of cells based on a signal or trigger generated by the controller.

The controller may be adapted to generate and/or transmit the signal or trigger when a temperature and/or pressure in the or each storage vessel and/or at least one of the cells exceeds a programmed or calculated threshold.

The power source system may comprise at least one electrical contact, e.g. two electrical contacts. The or each electrical contact may be directly, or indirectly, conductively connected to an electrode of one or more or each cell of the power source system. In a preferred embodiment, a first of the electrical contacts is directly, or indirectly, conductively connected to an anode of at least one or each of the plurality of cells. In a preferred embodiment, a second of the electrical contacts is directly, or indirectly, conductively connected to a cathode of at least one or each of the plurality of cells.

The power source system may be adapted for use in a tree, such as a subsea tree located at a wellhead of a completed well.

At least one of the plurality of cells, such as a cell in an operational state or the primary cell, may be assembled at surface. At least one of the plurality of cells may be at least partially filled with the at least one operating material at the surface.

The power source system may be adapted for location within a wellbore and/or downhole. The power source system may be adapted for location within a substantially annular region or void, e.g. within a wellbore, such as between a wellbore casing and a string. At least a portion of the power source system may be substantially curved, such that the power source system is adapted to fit in an annular region. When viewed along an axis, wherein the axis is substantially parallel to a wellbore, the power source system may be substantially arch shaped. That is, when viewed along an axis, wherein the axis is substantially parallel to a wellbore, the power source system may be substantially the shape of a segment of an annular region between a wellbore casing and a string.

The power source system may be substantially the shape of a segment of an annular region between a wellbore casing and a string, wherein the angle subtended by the power source system to the centre of the circle (i.e. the centre of the wellbore) may be between approximately 20 degrees and 60 degrees. One would appreciate that in alternative embodiments, the angle subtended by the power source system to the centre of the circle may be anything between 360 degrees (i.e. a full circle) and approximately 5 degrees.

The power source system may be adapted to be electrically and/or mechanically connected to a further power source system. A plurality of power source systems may be adapted to be connected, such that a total angle subtended by the plurality of power source systems to the centre of the wellbore is greater than an angle subtended by one power source system. A plurality of power source systems may be arranged and/or stacked and/or connected parallel to, or along, the axis.

Advantageously, space for power source systems is not significantly limited in a downhole environment, particularly is a direction parallel to, or along, the axis A plurality of power source systems may be adapted to be electrically connected in parallel or in series.

In a preferred embodiment, in the initial configuration, at least one or each of the at least two chambers or compartments of at least one of the plurality of cells comprises or contains at least one of the operating materials. That is, the power source system may be deployed, such as deployed downhole, with at least one of the cells, e.g. the primary cell, in the operational state or configured to use the transfer system to switch the at least one cell into the operational state downhole. In the operational state, the at least one cell may operate as an electrical battery and may generate an electrical charge. When deployed downhole, at least one or more or each of the cells may be in the non-operational state.

The power source system may be configured such that when the electrical charge of the one of the plurality of cells is depleted to the threshold, the power source system prepares another cell for use (i.e. by switching it from the non-operational state to the operational state) by providing an amount of at least one of the operating materials into the compartments or chambers of the another of the plurality of cells, e.g. a cell that is in the non-operational state.

As such, the power source system may be adapted to sequentially use (i.e. fill and subsequently deplete the charge of) each cell of the plurality of cells.

Advantageously, such an arrangement enables each cell, and particularly the separator and/or electrodes of each cell, to remain unaffected by a SEI layer, at least until such time as each cell is filled with the operating material (e.g. the electrolyte) and adapted to operate as a battery. Thus, the overall life of the power source system may be extended in comparison to a traditional flow battery or lithium cell.

Advantageously, such an arrangement enables the or each separator to be more porous at a start of a usage cycle of each battery, than if each battery/reaction chamber was stored with the fluids in contact with the separator i.e. stored in a filled state. Further, such an arrangement advantageously enables a volume-to-weight ratio of each cell to be lower than that of a primary Li-Ion cell. Further, the greater porosity at a start of a usage cycle of each battery allows an easier flow and combination of operating materials during the creation of new cells.

Advantageously, the power source system described herein effectively enables the creation of new batteries 'on-demand' (i.e. the cells when switched into the operational state) in a downhole environment, and overcomes the practical limitation of the prior art with regard to charge depletion of stored batteries. It will be appreciated that the present method may involve at least partly making batteries (i.e. the operational cells or cells in the operational state) by providing them with the operating material (such as electrolyte or a chemical reactant) rather than just simply charging the cells or by operating a switch to complete or open a circuit. For example, an estimate of a daily self-discharge rate of a lithium cell may be, for purposes of example, 0.01% of the total original charge at a temperature of 80 degrees Celsius. At a temperature of 90 degrees Celsius this may increase to approximately 0.025%. At 100 degrees Celsius this may increase to 0.04%. At 110 degrees Celsius this may increase to 0.095%. As such, a lithium cell with no usage may last approximately 1000 days due to the effects of self-discharge. In use, where the cell is used to power a device consuming 0.12 Amp Hours (Ah) per day and where the cell has a capacity of 100 Ah, with no self-discharge there would be sufficient charge for approximately 833 days of operation. However, at 100 degrees Celsius, and taking into account the self-discharge at such temperatures, there would be sufficient charge for only 625 days. In the case of two cells, wherein the second cell may be used when the first cell is depleted, due to the self-discharge of the second cell during the 625 days of usage of the first cell, only a total of approximately 1000 days operation is achievable with the two cells. Advantageously, in the case of the above power source system, because the second battery (i.e. a cell when switched into the operational state from the non-operational state) is effectively newly created upon demand, the second battery (i.e. the second or other cell when switched into the operational state from the non-operational state) in the above example would not be subject to self-discharge until the first battery (i.e. the previous cell to be in the operational state) was fully depleted or almost fully depleted (i.e. within the threshold amount of charge).

Advantageously, the battery apparatus described herein enables the use of wireless devices, such as wireless communication devices, to be located in a downhole environment with a power supply of sufficient longevity ensure operation of the wireless device for an extended period of time.

According to a second aspect of the present disclosure there is provided a method of use of a power source system according to the first aspect. The method comprising conductively connecting the power source system to an electrical load.

The method may comprise using electrical charge from a reaction in at least one of the cells of the power source system to provide the at least one operating material to at least one other of the cells of the power source system.

The method may comprise using electrical charge from the reaction in at least one of the cells of the power source system to provide the at least one operating material to the at least one other of the cells of the power source system when a usage of the at least one of the cells is equal to or above a threshold or the state of charge of the at least one of the cells is equal to or below a threshold.

The method may comprise the step of attaching or connecting the power source system to a downhole tool or downhole device, i.e. the load may be, comprise or be comprised in the downhole tool or device.

The method may further comprise the step of locating the power source system permanently, or semi-permanently downhole, or on or in a subsea tree.

The method may further comprise the step of filling the at least one storage vessel with an operating material, such as an electrolyte.

The method may further comprise the step of programming and/or calibrating the controller. The method may further comprise the step of selecting, calculating and/or deriving at least one threshold associated with each reaction vessel. The method may further comprise the step of programming the least one threshold associated with each reaction vessel.

The method may further comprise the step of conductively connecting the power source system to at least one further power source system. The method may further comprise the step of forming a serial or parallel conductive connection between the power source system and the least one further power source system.

The method may further comprise the step of communicating with the power source system. The method may further comprise the step of communicating, such as wirelessly communicating, with the power source system by means of a receiver, transmitter or transceiver.

When the power source system is located downhole or in/on a subsea tree, the step of communicating with the power source system may be by means of a receiver, transmitter or transceiver located at surface.

According to a third aspect of the present disclosure there is provided a downhole arrangement, the downhole arrangement comprising the power source system according to the first aspect.

The downhole arrangement may comprise a downhole tool. The downhole tool may comprise at least one of: an actuator, a sliding sleeve, a valve, a port. At least a portion of the downhole tool may be adapted to be powered by the power source system.

The downhole arrangement may comprise at least a portion of a wellbore casing. The downhole apparatus may contain at least a portion of a string, such as a production string.

The downhole arrangement may comprise a plurality of power source systems, each power source system of the plurality of power source system being according to the first aspect.

The downhole arrangement may comprise at least one power source system of the plurality of power source system conductively and/or mechanically connected to at least one other power source systems of the plurality of power source systems.

The power source system may be located within an annular region between the at least a portion of wellbore casing and the at least a portion of string, such as production string.

The downhole arrangement may comprise a plurality of power source systems conductively and/or mechanically connected to at least one other power source system of the plurality of power source systems may be connected and/or located within an annular region between a wellbore casing and a string.

The downhole arrangement may comprise a communication system. The communication system may be powered by the power source system. The communication system may be adapted for communication with, or between, a transmitter, receiver or transceiver located at surface.

It should be understood that the features defined above in accordance with any aspect of the present disclosure or below relating to any specific embodiment of the disclosure may be utilised, either alone or in combination with any other defined feature, in any other aspect or embodiment or to form a further aspect or embodiment of the disclosure.

BRIEF DESCRIPTION OF DRAWINGS

These and other aspects of the present disclosure will now be described, by way of example only, with reference to the accompanying drawings, which:

FIG. 5b a representation of a cross section of the downhole arrangement of FIG. 5a;

FIG. 7b a continuation of the flow diagram of FIG. 7a.

DETAILED DESCRIPTION OF DRAWINGS

Figure 1:
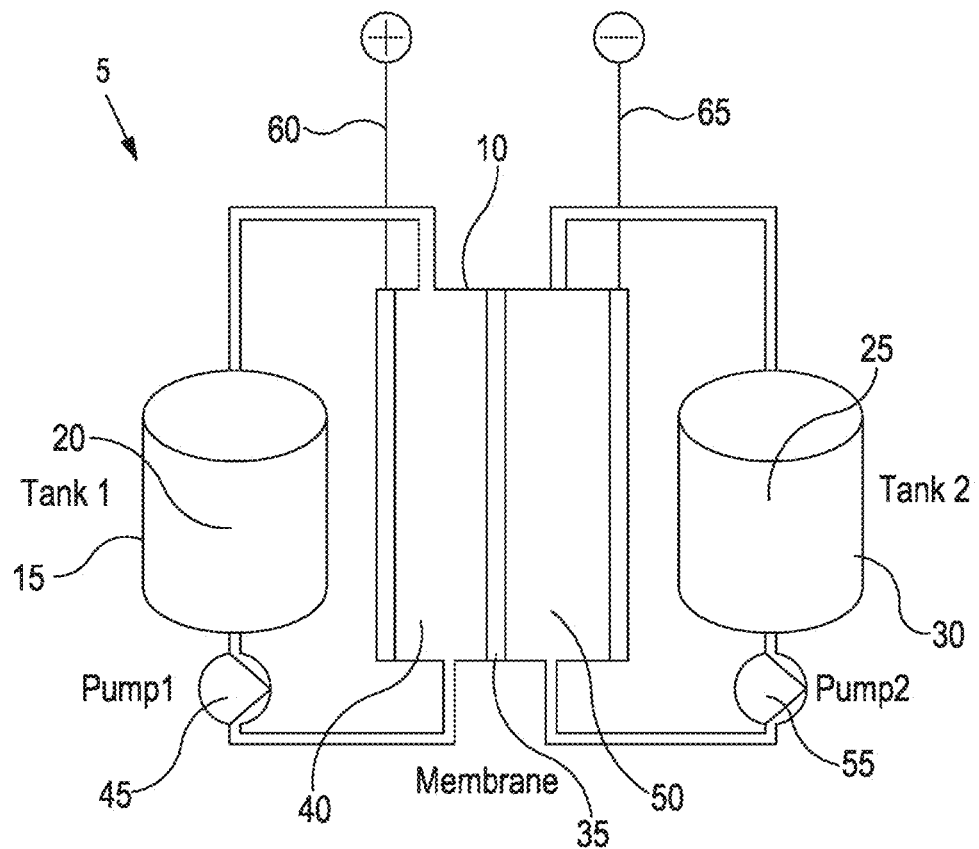
FIG. 1 an example of a prior art flow cell apparatus.

Referring firstly to FIG. 1 of the accompanying drawings, there is shown a prior art flow cell, generally denoted 5. The flow cell 5 comprises an electrochemical cell 10. A first tank 15 contains a first electroactive fluid 20. A second tank 25 contains a second electroactive fluid 30. The electrochemical cell 10 comprises a membrane 35 separating the fluids 20, 30. The first electroactive fluid 20 is circulated from the first tank 15 thought a first compartment 40 of the electrochemical cell 10 by a first pump 45. The second electroactive fluid 30 is circulated from the second tank 25 through a second compartment 50 of the electrochemical cell 10 by a second pump 55. Ion exchange, which provides a flow of electric current, occurs through the membrane 35 and a potential difference may be measured across electrical contacts 60, 65.

Figure 2:
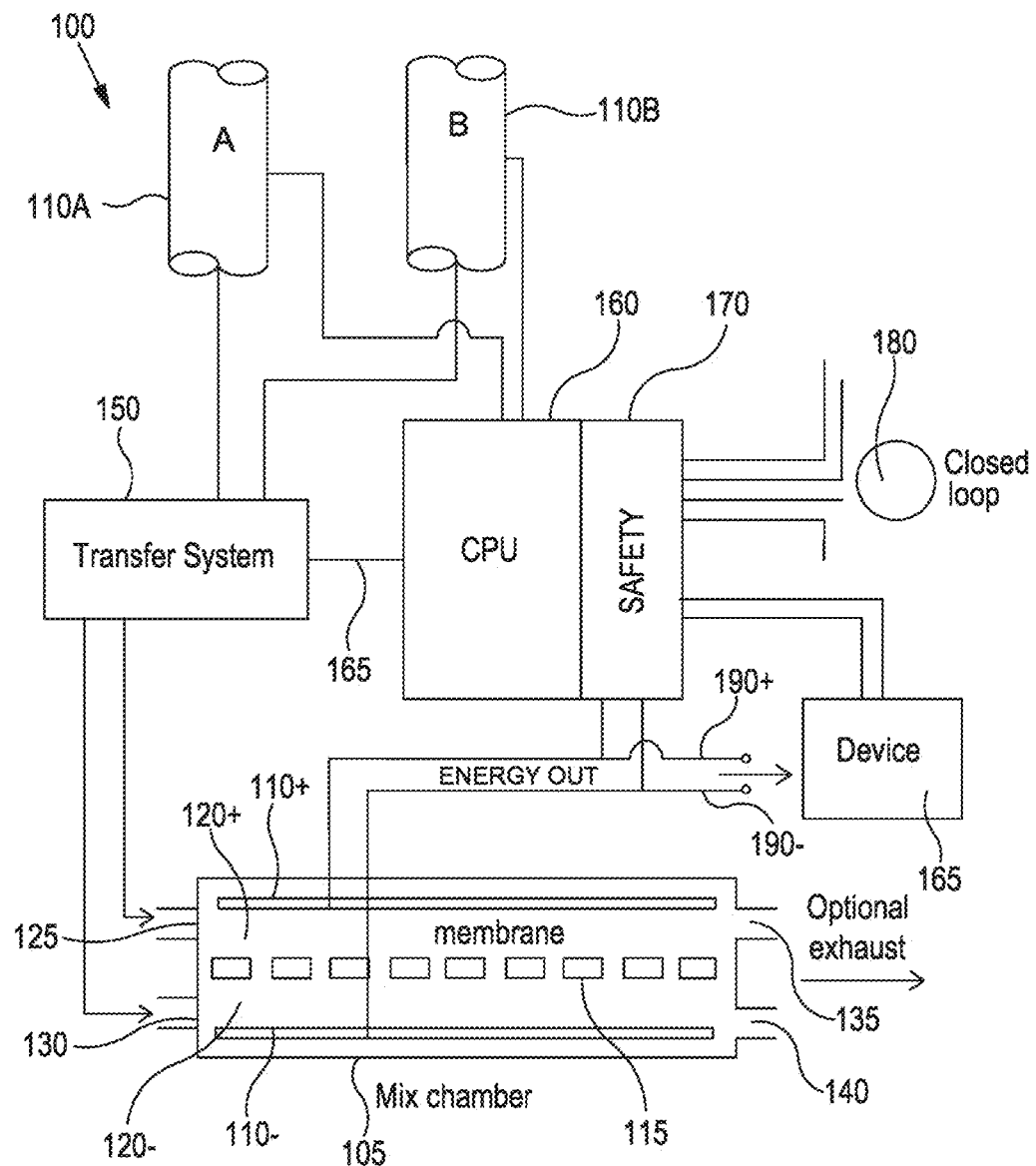
FIG. 2 an exemplary representation of a power source system.

FIG. 2 shows an exemplary representation of a power source system, generally denoted 100. In the simplified representation of the power source system 100 shown in FIG. 2, only a single cell 105 is shown for illustrative purposes but it will be appreciated that the system optionally but generally comprises a plurality of cells 105. The embodiment shown comprises two storage vessels 110A, 110B. Each storage vessel 110A, 110B is adapted to contain a respective operating material (not shown). In this example, the storage vessel 110A contains an operating material in the form of an oxidant forming one half of a REDOX couple, and the other storage vessel 110B contains a reductant forming the other half of a REDOX couple. Each storage vessel 110A, 110B is in direct fluid communication with a transfer system 150. Each storage vessel 110A, 110B is in indirect fluid communication with the cell 105.

The cell 105 comprises two electrodes 110+, 110−. One electrode 110− is a cathode. One electrode 110+ is an anode. In will be appreciated that in optional embodiments, the electrode may be non-porous or porous such that each electrode 110+, 110− is permeable to operating material, as described below.

The cell 105 comprises a separator 115. The separator 115 is a porous membrane. One would appreciate that in other embodiments encompassing the inventive concept disclosed herein, the separator 115 may comprise a solid electrolyte or an ion exchange membrane such as NAFION. The separator 115 partitions an interior of the cell 105 into two compartments 120+, 120−. The separator 115 is arranged within the cell 105 between the electrodes 110+, 110−. The separator 115 is arranged within the cell 105 such that it electrically isolates one electrode 110+ from the other electrode 110−. As such, the separator 115 is arranged to prevent electrical short circuit between the electrodes 110+, 110−. The separator 115 comprises a non-conductive material, such as a polymeric material or a polyolefin based material. One would appreciate that in alternative embodiment encompassing the inventive concept disclosed herein, the electrodes 110+ and 110− may be positioned differently within the cell, such as abutting a face or interior surface of the cell. In other embodiments, the call may not comprise electrodes 110+ and 110−. For example, in alternative embodiments, the reactants may operate as at least part the electrodes.

The transfer system 150 is adapted to induce a movement or flow of operating material from storage vessels 110A, 110B to the cell 105. The transfer system 150 comprises a pump (not shown). The transfer system 150 is adapted to pump operating materials from the storage vessels 110A, 110B to the cell 105.

The transfer system 150 is communicatively linked to the controller 160. The transfer system 150 is communicatively linked to the controller 160 by a communications link 165. In use, the transfer system 150 is controlled by the controller 160.

The controller 160 comprises an electronic system. The controller 160 comprises at least one microprocessor (CPU) and/or microcontroller. The controller comprises a memory (not shown), wherein the memory may comprise a non-volatile memory and/or a volatile memory.

The controller 160 is adapted to record and/or monitor a usage of the cell 105. The controller is adapted to record and/or monitor data from at least one sensor (not shown). Data relating to the usage of the cell 105 is stored in the memory. Data relating to the at least one sensor is stored in the memory. In use, the controller 160 is adapted to calculate an initial and/or maximum capacity (i.e. the amount of electric charge that can be delivered) of the cell 105 or retrieve a predetermined or provided value from the memory. The controller 160 is adapted to calculate an amount of energy depleted from the cell 105. The controller 160 is adapted to operate the transfer system 150. The controller 160 is adapted to measure and/or is programmed with, parameters which comprise data relating to temperature and/or pressure within an operating environment of the power source system 100. The measured and/or programmed parameters may comprise data relating to quantity and type of use of the power source system 100, such as use to actuate a device 165.

In use, the controller 160 is programmed with, or adapted to calculate, a threshold. The threshold is associated with the cell 105. The threshold corresponds to a proportion of a calculated charge available based on a usage of the cell 105.

One would appreciate that in an alternative embodiment, the controller 160 may be adapted to measure and/or record a voltage at a terminal of the power source system 100. In such an embodiment, the voltage may be indicative, or related, to a capacity of a primary cell 220 (as described below in relation to FIG. 3) and/or at least one cell 105. In such an embodiment, the threshold may be predetermined, selected or programmed to a voltage that corresponds to a capacity of the cell.

The controller 160 is coupled to the device 165. The device 165 is an electrical load, i.e. a resistive load, that draws current from the power source system 100. For example the device 165 may comprise sensors that are monitored by the controller 160. The device 165, which may be a downhole tool or the like, is powered by the cell 105.

The controller 160 is adapted to control a flow of operating material into the cell 105. For example, in embodiments, the controller 160 is adapted to control the flow of the at least one operating material into and/or out of at least one of a plurality of cells based on parameters which include at least one of: a quantity of the at least one operating material; a flow rate of the at least one operating material; a pressure of the at last one operating material and/or a pressure in the cell 105.

In some embodiments, the controller 160 controls a closed-loop system 180 to control the flow of the at least one operating material into and/or out of the cell.

The power source system 100 comprises a safety system 170. The safety system 170 is adapted to monitor and/or control at least a portion of the power source system 105. The safety system 170 is communicably coupled to the controller 160. In other embodiments encompassing the inventive concept disclosed herein, the safety system 170 is part of, or incorporated within, the controller 160.

The power source system 100 comprises two electrical contacts 190+, 190−. Each electrical contact 190+, 190− is conductively connected to an electrode 110+, 110− of the power source system 100. The device 165 is adapted to be conductively connected to the electrical contacts 190+, 190−.

Figure 3:
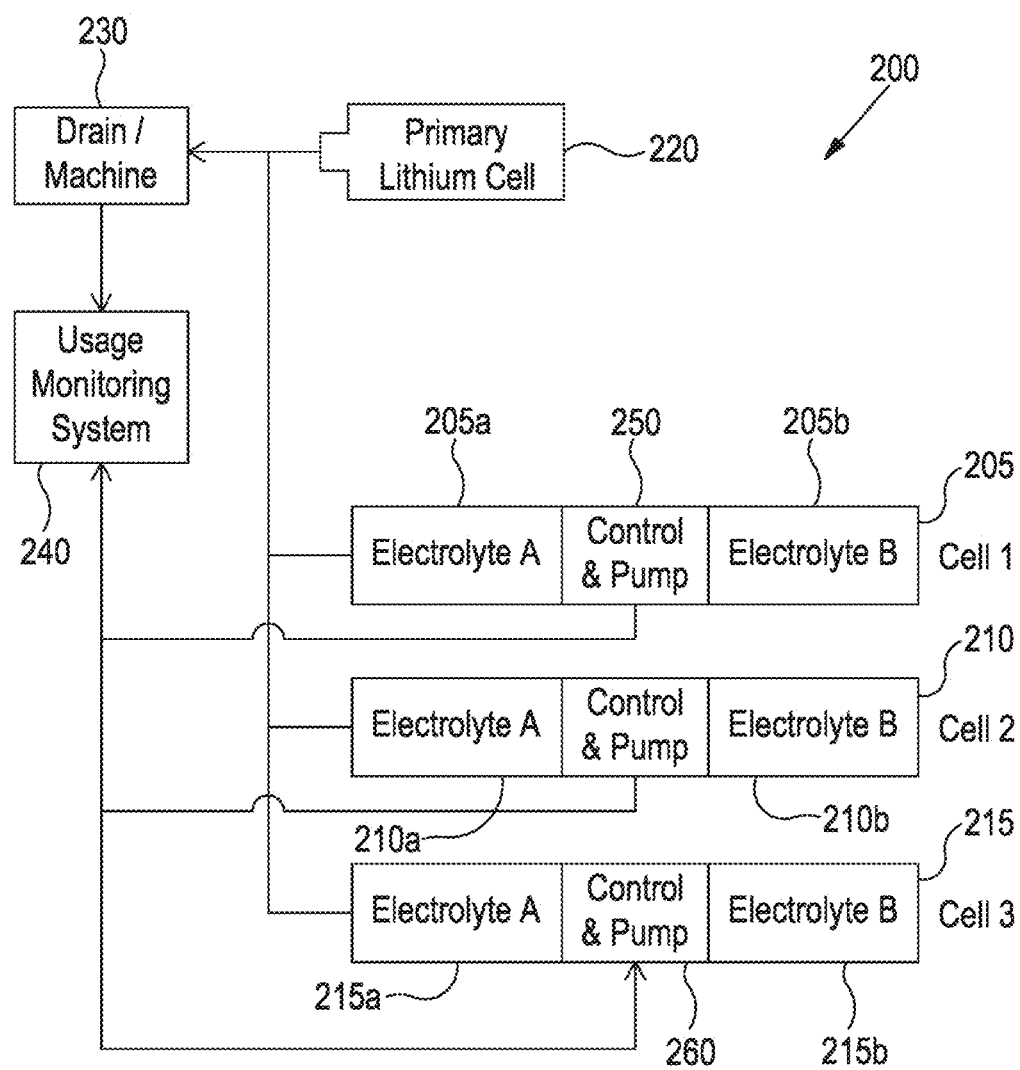
FIG. 3 a representation of another example of a power source system.

Referring now to FIG. 3, there is shown a representation of an apparatus, generally denoted 200.

The apparatus comprises a plurality of cells 205, 210, 215. The plurality of cells 205, 201, 215 are arranged in a cascaded manner, wherein an electrical charge generated by a reaction in a first cell 205 conveys at least one operating material from a storage vessel to at least one other 210, 215 of the plurality of cells 205, 210, 215.

In the exemplary embodiment of FIG. 3, the power source system 200 comprises three cells 205, 210, 215. However, one would appreciate that in other embodiments encompassing the inventive concept disclosed herein, there may be one or two cells, or there may be four or more cells.

In use, each cell 205, 210, 215 is adapted to operate as a power source. In use, each cell 205, 210, 215 contains one or more electrochemical cells.

The power source system 200 comprises a primary cell 220. The primary cell 220 comprises at least one lithium cell 220. The primary cell 220 is adapted to generate an electrical charge.

Each cell 205, 210, 215 comprises two compartments 205a, 205b, 210a, 210b, 215a, 215b.

In an initial configuration, one of the compartments 205a, 205b, 210a, 210b, 215a, 215b in each cell 205, 210, 215 are devoid of operating material. In an alternative configuration that falls within the scope of the inventive concept disclosed herein, in the initial configuration, all of the compartments 205a, 205b, 210a, 210b, 215a, 215b in each cell 205, 210, 215 are devoid of operating material.

In the initial configuration, the primary cell 220 is adapted to provide electrical power to a device 230. The electrical device 230 is an electrical load i.e. draws electrical current from the power source system 200. In the initial configuration, a usage monitoring system 240 is adapted to record and/or monitor a usage of the primary cell 220. In further configurations, the usage monitoring system 240 is adapted to record and/or monitor a usage of each of the cells 205, 210, 215.

The power source system 200 is adapted to convey at least one operating material from an operating material storage vessel (not shown in FIG. 3) to one of the cells 205, 210, 215 when the usage of the primary cell 220 exceeds a threshold.

Upon conveying at least one operating material from the at least one storage vessel to at least one of the cells 205, 210, 215, at least one cells 205, 210, 215 reverts from a non-operational state to an operational state. In the non-operational state, the cell 205, 210, 215 is adapted to generate an electrical charge. In the operational state, the cells 205, 210, 215 is adapted to operate as a power source.

The power source system 200 comprises a controller and transfer system 250, 255, 260. In the embodiment shown, the controller and transfer system is shown as a distributed system spread across three cells 205, 210, 215. In other embodiments, there may be a single controller and/or a single transfer system, or some or all of the controller and/or transfer system may be distributed within the power source system 200.

In use, the transfer system 250, 255, 260 is adapted to induce a movement or flow of operating material from at least one storage vessel (not shown in FIG. 3) to at least one of the cells 205, 210, 215. The transfer system 250, 255, 260 comprises a pump. The transfer system is adapted to pump at least one operating material from the at least one storage vessel to at least one of the cells 205, 210, 215.

Figure 4:
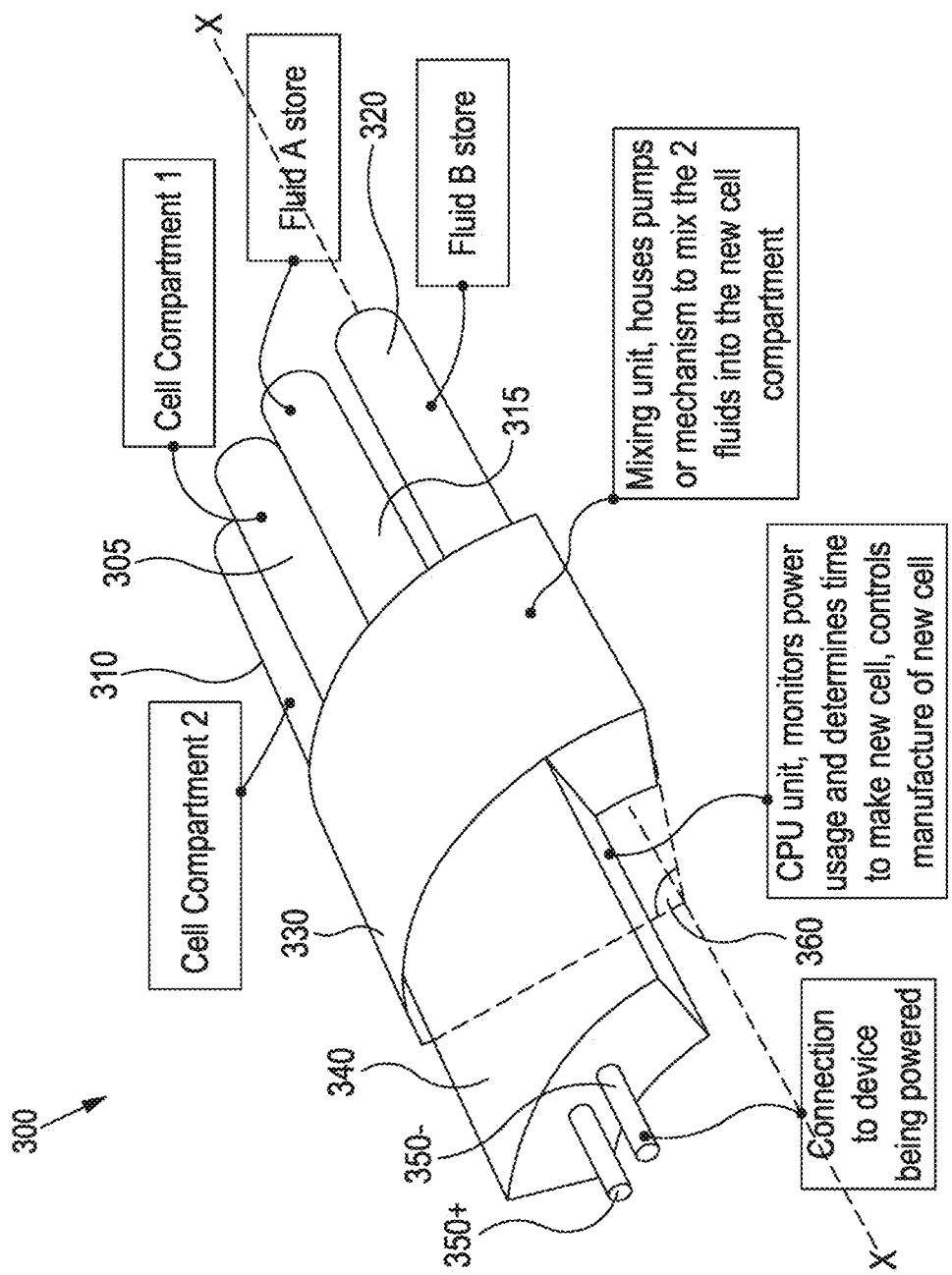
FIG. 4 a perspective view of another example of a power source system.

Referring now to FIG. 4, there is shown a perspective view of an exemplary embodiment of a power source system, generally denoted 300. The power source system 300 comprises a first cell 305, a second cell 310, a first storage vessel 315 and a second storage vessel 320. The power source system 300 comprises a transfer system 330. The transfer system comprises a pump, one or more valves and/or the like, and is adapted to induce a movement or flow of operating material from the storage vessels 315, 320 to the cells 305, 310.

The power source system 300 comprises a controller 340. The power source system 300 comprises two electrical contacts 350+, 350−. Each electrical contact 350+, 350− is conductively connected to at least one electrode (not shown in FIG. 3) of the power source system 300. The controller monitors power usage from, and/or state of charge of, the first cell 305 and the second cell 310 and is configured to operate the transfer system 330 to transfer operating material (e.g. an electrolyte and/or reactants) from the storage vessels 315, 320 into the second cell 310 from the when the usage of the first cell 305 is above a threshold or the state of charge of the first cell 305 is below a threshold.

The power source system 300 is adapted for use downhole. The power source system 300 is adapted for location within a wellbore. For example, the power source system 300 is shaped such that it may be located within a substantially annular region or void, e.g. within a wellbore, such as between a wellbore casing and a string. The power source system 300 is substantially curved, such that the power source system 300 is adapted to fit in an annular region. When viewed along an axis X, the power source system 300 is substantially arch shaped.

The power source system 300 is curved, wherein an angle 360 subtended by the power source system 300 to a circle centred on axis X is between approximately 20 degrees and 60 degrees. One would appreciate that in alternative embodiments, the angle 360 may be anything between 360 degrees (i.e. a full circle) and approximately 5 degrees.

Figure 5A:
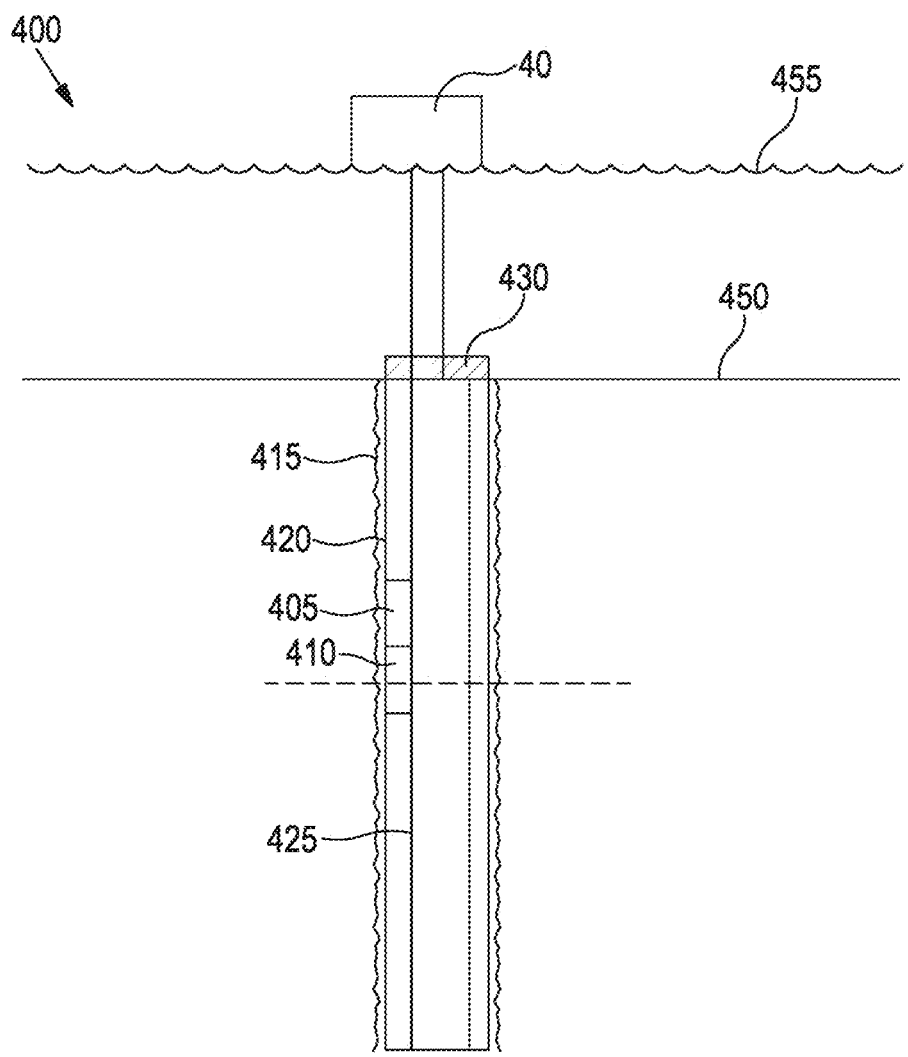
FIG. 5a a representation of a downhole arrangement comprising a power source system.

Referring now to FIG. 5a, there is shown a representation of a downhole arrangement, generally denoted 400. The downhole arrangement 400 comprises a downhole tool 405 and a power source system 410, which is optionally a downhole system such as that of any of FIGS. 2 to 4. In exemplary embodiments, the downhole tool 400 may comprise at least one of: an actuator, a sliding sleeve, a valve, or a port. At least a portion of the downhole tool 400 is adapted to be powered by the power source system 410.

There is shown a rig or floating vessel 440 located at a surface 455 of the sea. The rig 440 is connected to a well head or subsea tree 430 located at seabed 450. A wellbore 415 extends below the seabed 450 from the subsea tree 430. The wellbore 415 is lined with a wellbore casing 420. A string, such as a production string 425, is located within the wellbore casing 420.

In the exemplary embodiment shown, the power source system 410 is located within an annular region between the at least a portion of wellbore casing 420 and at least a portion of production string 425.

Figure 5B:
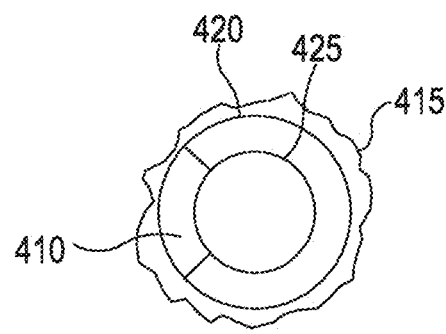

FIG. 5b shows a cross section of the arrangement of FIG. 5a, taken across the dashed line in FIG. 5b. The power source system 410 is substantially the shape of a segment of an annular region between a wellbore casing 420 and the string 425, wherein the angle subtended by the power source system 420 to the centre of a circle (i.e. the centre of the wellbore) is between approximately 20 degrees and 60 degrees. One would appreciate that in other embodiments encompassing the inventive concept disclosed herein, the power source system may be integrated within a tool, a sleeve, or any completion device or tool, or the like.

Figure 6:
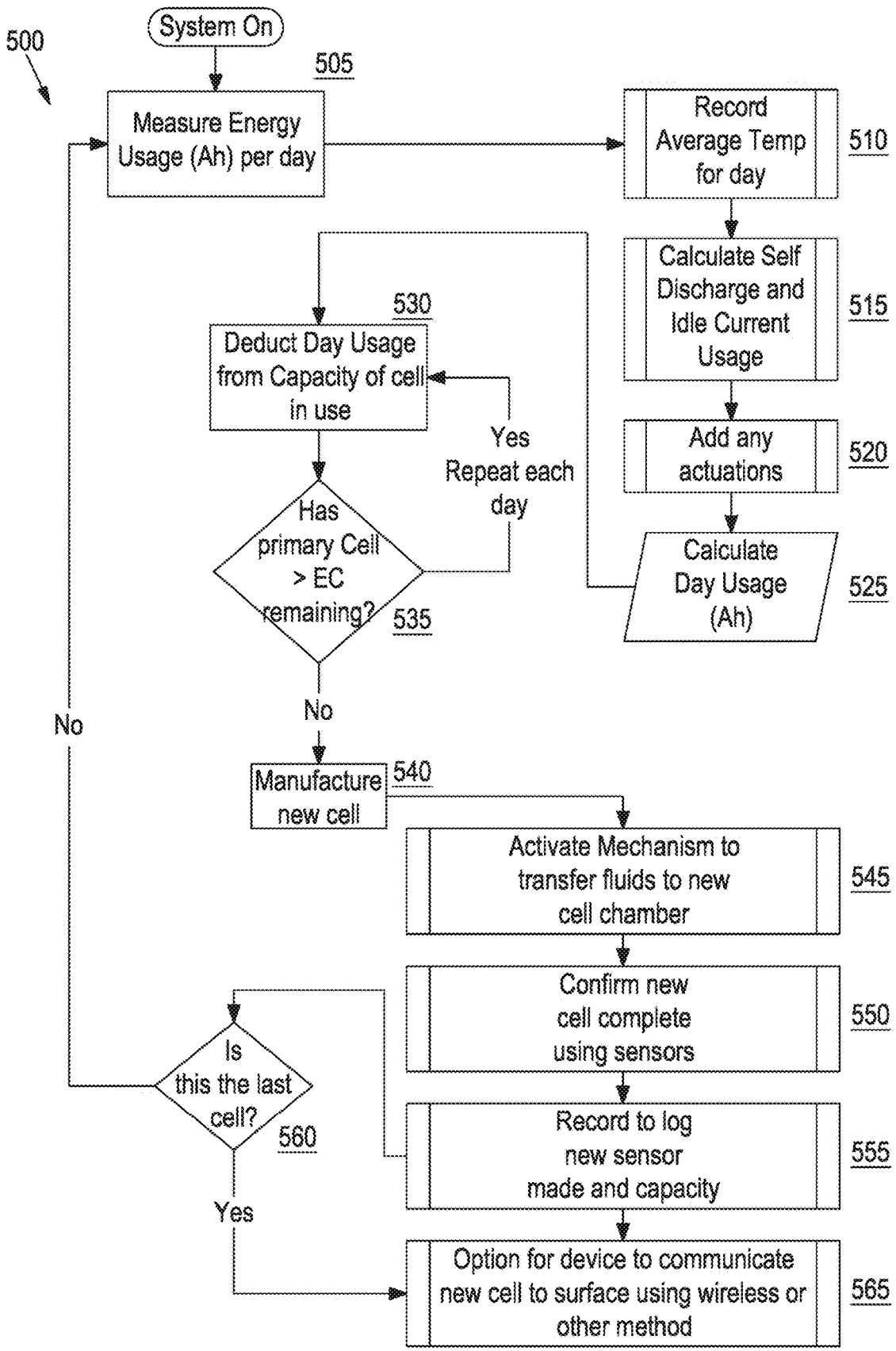
FIG. 6 a flow diagram of a method for using a power source system such as that of any of FIGS. 2 to 4.

Referring now to FIG. 6, there is shown a flow diagram, generally denoted 500.

At step 505 the controller measures an energy usage, such as an energy usage incurred by an electrical load i.e. a tool or device, over a period of one day. One of skill in the art would recognise that the unit of time may be more or less than one day, and may not be restricted to precisely one day.

At step 510, the controller records and an average temperature, such as an average temperature of a cell, or of an environment in the proximity of a cell, over the period of one day. The controller may also calculate the average temperature based on a plurality of temperature measurements made throughout the day.

At step 515, the controller calculates a self-discharge of a cell and idle current usage. The controller may use data collected from various sensors, such as temperature and/or pressure sensors to perform the calculation. Similarly, the controller may use stored data, such as stored calibration data or a look-up table or the like, in conjunction with measured data, or alone, to perform the calculation.

At step 520, the controller totals a contribution made by actuation or use of any tools or devices.

At step 525, a total daily usage, i.e. usage of the capacity of the cell, that includes contributions made by actuation or use of any tools or devices and self-discharge and idle current usage is calculated.

At step 530, the total calculated in step 525 is deducted from a stored capacity of the cell to determine a new capacity of the cell.

At step 535, the new capacity calculated in step 530 is compared with a threshold. If the new capacity falls below the threshold, manufacture of a new cell is triggered at step 540. If the threshold does not exceed the new capacity, then the process from steps 505 to 530 is repeated in the next period of time i.e. one day.

At step 545, the transfer mechanism is activated to convey operating material (e.g. electrolyte and/or one or more reactants) to a cell. At step 550, the controller confirms the cell is adequately prepared, i.e. a correct, or large enough quantity of operating material has been conveyed.

At step 555, the controller updates its records stored in memory with characteristics of the new cell. At step 565, the controller communicates at least a portion of the updated records to a receiver, such as a receiver located at surface.

At step 560, the controller determines whether the cell manufactured in steps 540 to 555 is a final available cell. If so, then at step 565 this information is communicated to a receiver, such as a receiver located at surface. Otherwise the process is repeated with the measurements being based on the newly formed cell.

One would understand that, without deviating from the inventive concept disclosed herein, communication between the controller and a receiver, or transceiver, in particular regarding the status of at least one cell, may be undertaken at any stage in the process described by FIG. 6.

Figure 7A:
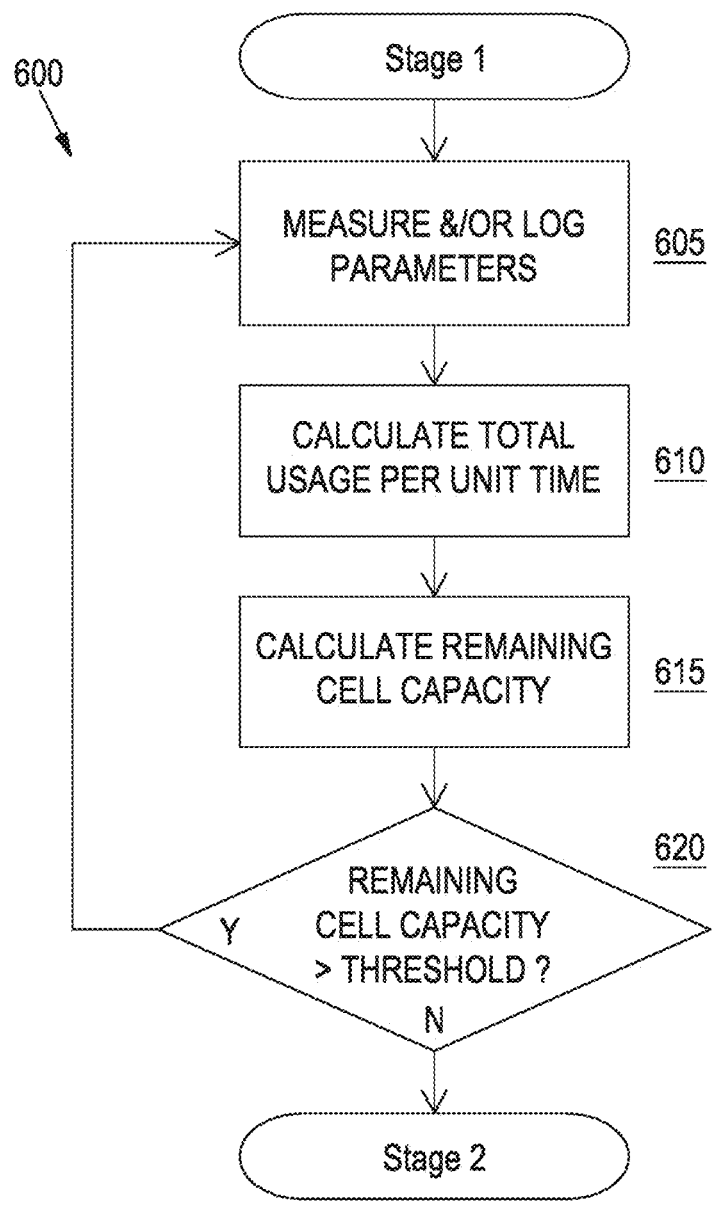
FIG. 7a a flow diagram of a method for using a power source system such as that of any of FIGS. 2 to 4.

Referring now to FIG. 7a, there is shown a flow diagram, generally denoted 600.

At step 605 the controller measures and/or logs parameters, such as data collected by temperature and/or pressure sensors, and data related to actuations or usage of electrical loads, such as tools, over a period of time.

At step 610, the controller calculates a total usage i.e. usage of the capacity of the cell, based on the parameters logged at stage 605. One would appreciate that in an alternative embodiment, the controller may calculate in real-time, or pseudo real-time, a total usage and/or remaining capacity of the cell.

Figure 7B:
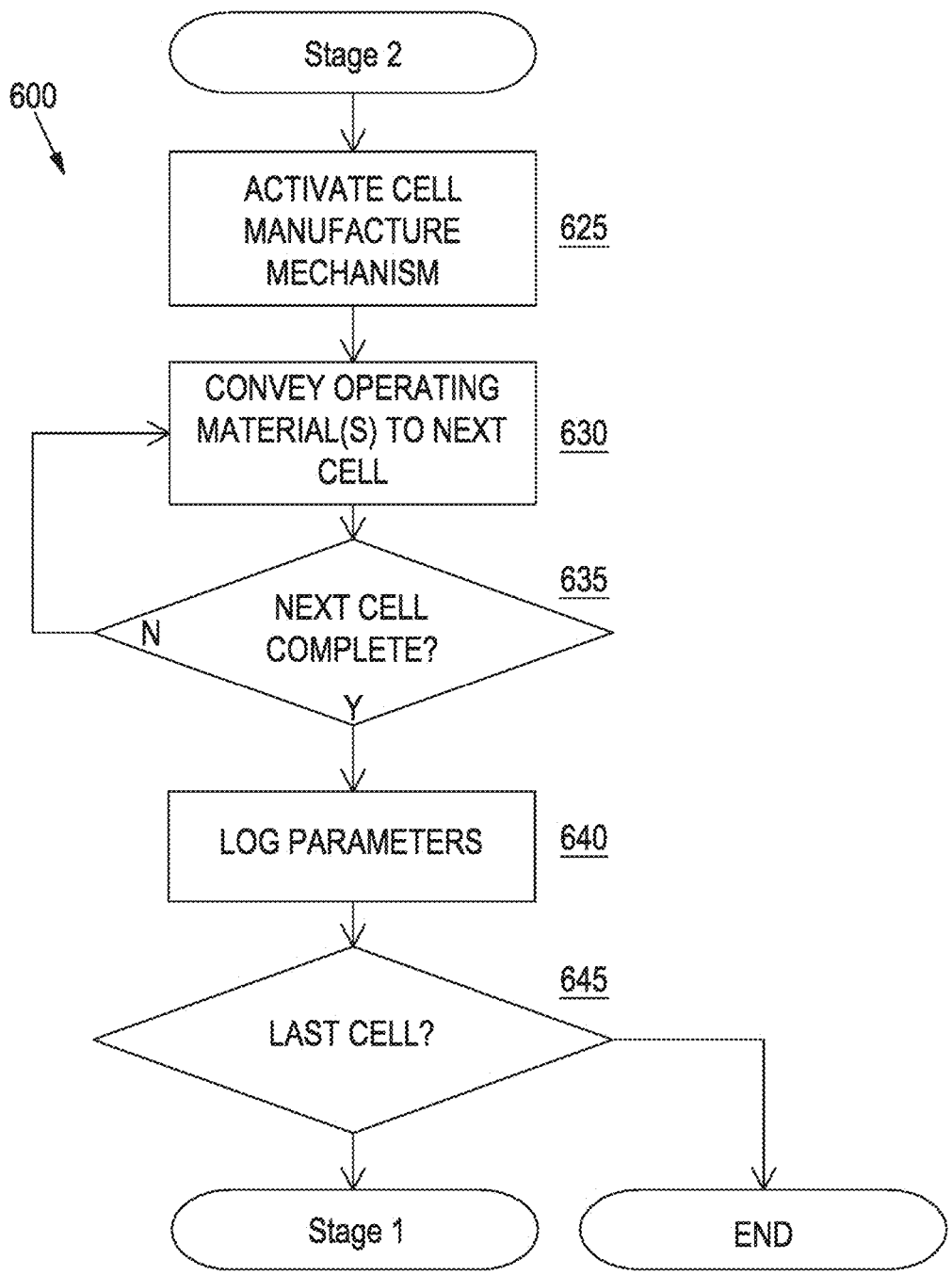

At step 615, if not already done so at step 610, the controller calculates a remaining capacity of the cell. At step 620, the remaining capacity of the cell calculated at step 610 or 615 is compared to a threshold. If the remaining capacity exceeds the threshold, then the process reverts to step 605. If the remaining capacity is less than the threshold, then the process continues to step 625 (FIG. 7b).

At step 625, the transfer system is triggered by the controller to manufacture a new cell. At step 630, operating material is conveyed to the new cell. At step 635 the controller determines that manufacture of the new cell is complete by, for example, use of sensors to assess whether an adequate amount of operating material has been conveyed to the new cell.

At step 640, the controller records or logs characteristics of the new cell. The controller may record this information in its memory and/or the controller may communicate this information to a receiver, such as a receiver located at surface.

At step 645, the controller makes a determination of whether the new cell is a final cell that the power source system supports. If the power source system supports manufacture of at least one further cell, the process reverts to step 605. If the power source system does not support manufacture of at least one further cell, the process is completed. It should be understood that, without deviating from the inventive concept disclosed herein, communication between the controller and a receiver, or transceiver, in particular regarding the status of at least one cell, may be undertaken at any stage in the process described by FIGS. 7a and 7b.

It will be appreciated that the embodiments of the present disclosure herebefore described are given by way of example only and are not meant to limit the scope thereof in any way.

It will be appreciated that embodiments of the present disclosure provide benefits over the prior art.

The invention claimed is:

1. A power source system comprising:
a plurality of cells, each cell being switchable from a non-operational state to an operational state by providing at least one operating material to the cell; and
a controller configured to record and/or monitor energy usage from the cells,
wherein the power source system is configured to use electrical charge or current generated by a reaction in at least one of the cells to provide the at least one operating material to at least one other of the cells when the energy usage from the at least one of the cells determined by the controller is equal to or above a threshold.

2. The power source system of claim 1, comprising at least one storage vessel for storing the at least one operating material; and wherein the power source system is configured to use the electrical charge generated by the reaction in the at least one of the cells to provide the at least one operating material from the at least one storage vessel to the at least one other of the cells.

3. The power source system of claim 1, wherein, in an initial or non-operational state, one or more or each of the cells are dry or without the at least one operating material; and the power source system is configured to selectively switch at least one of the plurality of cells from the non-operational state to an operational state by providing the at least one operating material to the at least one cell wherein in the operational state, the at least one operating material is active or usable in an electrochemical reaction.

4. The power source system of claim 1, wherein the reaction is or comprises a reaction that utilizes the at least one operating material, and wherein the reaction is or comprises an electrochemical reaction.

5. The power source system of claim 1, wherein the operating material is, or comprises, or is comprised in, a fluid, liquid, gas, a colloid or a solution.

6. The power source system of claim 1, wherein one or more or each cell comprises:
a separator that comprises one of: a membrane, a porous separator or a solid electrolyte membrane;
at least two chambers, which are separated by the separator; and
at least two electrodes, wherein the at least two electrodes comprise at least a cathode and an anode and wherein at least one electrode is provided in one of the chambers on one side of the separator and at least one other electrode is provided in another one of the chambers on another side of the separator.

7. The power source system of claim 6, wherein the system is configured to use the electrical charge generated by the reaction in the at least one of the cells to provide at least two respective different operating materials to respective different chambers of the at least one other of the cells.

8. The power source system of claim 1, wherein the power source system is configured to enable or control transmission of at least one operating material from a storage vessel to at least one of the plurality of cells when the usage of the at least one of the plurality of cells is substantially equal to or above the threshold or when tea state of charge of the at least one of the plurality of cells is equal to or below a threshold.

9. The power source system of claim 1, wherein the plurality of cells is arranged sequentially and/or in a cascaded manner, and the electrical charge or current generated by at least one of the plurality of cells directly or indirectly enables transmission of the at least one operating material to the at least one other of the plurality of cells.

10. The power source system of claim 1, wherein the power source system is adapted for use downhole.

11. The power source system of claim 1, wherein:
the system comprises a transfer system for providing the at least one operating material to selected cells;
a storage vessel is in direct or indirect fluid communication with the transfer system or at least one of the plurality of cells;
the transfer system is operable using the charge or current generated by at least one of the cells and/or by the controller; and
the transfer system is configured to pump, and/or induce a movement or flow of the at least one operating material to or from at least one or each of the plurality of cells.

12. The power source system of claim 11, wherein the transfer system is controlled by the controller, and wherein the controller is configured to monitor one of: a usage of cells and state of charge of the cells.

13. The power source system of claim 12, wherein
the controller is programmed with or configured to calculate an initial capacity of at least one or each cell and to calculate an amount of energy depleted from the at least one or each cell.

14. The power source system of claim 1, wherein the power source system is adapted for location within a substantially annular void within a wellbore.

15. A method of using a power source system according to claim 1, the method comprising using electrical charge from the reaction in at least one of the cells of the power source system to provide the at least one operating material to the at least one other of the cells of the power source system when a usage of the at least one of the cells is equal to or above a threshold or a state of charge of the at least one of the cells is equal to or below a threshold.

16. The method of claim 15, the method further comprising one or more of:
connecting the power source system to a downhole tool or downhole device;
locating the power source system permanently or semi-permanently downhole, or on or in a subsea tree.

17. A downhole arrangement, the downhole arrangement comprising the power source system according to claim 1 and a downhole tool, wherein at least a portion of the downhole tool is configured to be powered by the power source system.

18. The downhole arrangement of claim 17, wherein the arrangement comprises at least a portion of a wellbore casing and at least a portion of a string, and the power source system is located within an annular region between the at least a portion of wellbore casing and the at least a portion of string, and the downhole arrangement comprises a communication system, wherein the communication system is powered by the power source system and adapted for communication with a transmitter, receiver or transceiver located at surface.

19. A power source system comprising at least one or a plurality of, cells; and a controller configured to record and/or monitor energy usage from the cells, wherein
the power source system is configured to convert at least one of the cells from a non-operational state to an operational state, or to make at least one operational cell from at least one of the cells, by providing at least one operating material to the at least one cell with the at least one of the cells in-situ, downhole or remotely located, by providing at least one operating material to the at least one cell using electrical charge or current generated by one of: a reaction in at least one other of the cells; at least one operational cell; and a downhole generator when the energy usage from the at least one of the cells determined by the controller is equal to or above a threshold.

* * * * *